United States Patent
Tonkin et al.

(12) 
(10) Patent No.: US 6,484,439 B1
(45) Date of Patent: *Nov. 26, 2002

(54) IRRIGATION DEVICE

(75) Inventors: Mark Christopher Tonkin, The Barn, Ripe Lane (GB); Mark Andrew Young, Hemel Hempstead (GB); Olaf Norbert Kirchner, Wilmington, DE (US); Charles William Cahill, Newark, DE (US)

(73) Assignees: E.I. du Pont de Nemours and Company, Wilmington, DE (US); Design Technology & Innovations LTD, East Sussex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,799

(22) Filed: Aug. 6, 1999

(51) Int. Cl.[7] .................................................. A01G 29/00
(52) U.S. Cl. ........................................ 47/48.5; 47/65.5
(58) Field of Search ................................ 47/48.5, 65.5, 47/65.7, 66.7, 79, 80

(56) References Cited

U.S. PATENT DOCUMENTS

| | | | |
|---|---|---|---|
| 2,222,815 A | * 11/1940 | Johnson | 47/58.1 |
| 2,315,949 A | * 4/1943 | Fischer | 47/58.1 |
| 4,698,135 A | 10/1987 | Raab | |
| 4,698,372 A | 10/1987 | Moss | |
| 4,725,481 A | * 2/1988 | Ostapchenko | 428/213 |
| 4,769,273 A | * 9/1988 | Hoeschele et al. | 428/215 |
| 5,067,272 A | 11/1991 | Constantz | |
| 5,664,369 A | 9/1997 | Kertz | |
| 5,951,204 A | 9/1999 | Roberts et al. | |
| 5,974,735 A | * 11/1999 | Behrens | 47/58.1 |
| 6,102,204 A | * 8/2000 | Castleberry | 206/423 |

FOREIGN PATENT DOCUMENTS

| | | |
|---|---|---|
| DE | 40 24 405 A1 | 2/1992 |
| EP | 238 941 B1 | 3/1987 |
| EP | 0 238 941 A1 | 9/1987 |
| EP | 0 268 556 B1 | 4/1991 |
| WO | WO 95/24260 A1 | 9/1995 |
| WO | WO 99/40031 A2 | 8/1999 |
| WO | WO 00/28807 A1 | 5/2000 |

OTHER PUBLICATIONS

Japanese Abstract, JP04063522 A, Eisai Seikaken KK and (Nitl) Nitto Denko Corp., Oct. 6, 1993.

* cited by examiner

Primary Examiner—Charles T. Jordan
Assistant Examiner—Judith A. Nelson

(57) ABSTRACT

An irrigation device is provided, the device comprising a container for water consisting of a plurality of surfaces, each surface substantially being either a hydrophilic membrane or impervious to water in all forms, and wherein at least one of the surfaces is substantially a hydrophilic membrane and at least one of the surfaces is substantially impervious to water in all forms.

15 Claims, 2 Drawing Sheets

IRRIGATION DEVICE

This invention relates generally to irrigation devices and specifically to irrigation devices comprising a hydrophilic membrane.

BACKGROUND OF THE INVENTION

In most cases the cultivation of plants requires the provision at intervals of water; however, the frequency of these intervals and the amount of water provided varies widely, from the occasional watering of a pot plant or garden plants, to the almost continuous provision of water during commercial agriculture in particularly dry regions of the world. The various methods of irrigation adopted reflect these different requirements; however, most still suffer from serious disadvantages in that they may be labor intensive (e.g. watering of garden plants by hand or the monitoring of agricultural crops), wasteful of water (e.g. automated non-regulated agricultural or large scale domestic watering systems) or particularly complex and expensive (e.g. computer regulated, automated agricultural systems). Furthermore, many large-scale agricultural systems are buried in the ground requiring major preparation before installation and causing difficulties in maintenance and detecting, isolating and repairing leaks.

There is therefore a need for simple, easy to install and maintain irrigation devices that release water only when required.

Numerous materials that allow the passage of water whilst restricting the passage of suspended or even dissolved materials are known. One recently identified group of materials are hydrophilic polymers. Membranes of these materials are known to be impervious to liquid water but to allow the passage of water vapor (a process known as pervaporation). If there is a vapor pressure gradient across a hydrophilic membrane, water will be absorbed from the side with the higher vapor pressure, and transported across the membrane and released as water vapor on the side with the lower vapor pressure; the released water vapor may be used directly or condensed back to liquid water. However, in either case, it may be pure (both chemically and microbiologically) as any contaminants will be retained either on the other side of the membrane or (in some cases) in the membrane itself.

SUMMARY OF THE INVENTION

It has now been found that a container of water having at least one surface constructed from a hydrophilic membrane, when placed with that surface in contact with an area of growing medium, will release water at variable rates to maintain a particular moisture level in that area of growing medium and a surrounding area. Furthermore, this rate of water release may be controlled by the choice of materials used to construct the said one or more hydrophilic membrane surfaces.

There is therefore provided an irrigation device comprising a container for water consisting of a plurality of surfaces, each surface substantially being either a hydrophilic membrane or impervious to water in all forms, and wherein at least one of the surfaces is substantially a hydrophilic membrane and at least one of the surfaces is substantially impervious to water in all forms.

Preferably in the devices of the present invention, each surface is either a hydrophilic membrane or is impervious to water in all forms.

DETAILED DESCRIPTION OF THE INVENTION

By irrigation is meant the provision of sufficient water to an area of growing medium having plants therein to allow the plants to grow. Preferably a sufficient amount of water is delivered to the growing medium to optimize the growth of the plants therein.

Devices of the present invention may be used for all forms of irrigation; for example, for individual pot plants; in domestic gardens; in commercial plant nurseries or in all scales of agriculture.

Devices of the present invention regulate the amount of water released into an area of growth medium because the hydrophilic membrane will only allow the passage of water vapor across a vapor pressure gradient, i.e. if the growth medium below the device is waterlogged, no transport at all will occur, and the drier the growth medium becomes the faster will the rate of water transport out of the device into the growth medium become. As the water diffuses away from the point of contact with the device, a larger area of growing medium will become irrigated, and more water will be released from the device unless an equilibrium is reached.

In the context of the present invention, growth medium means any solid medium in which plants are planted and includes naturally occurring or artificially amended soils, and other materials for growing plants, such as vermiculite, perlite, peat moss, shredded tree fern trunks, chipped or shredded tree bark and shredded coconut husks.

In the context of the present invention hydrophilic membranes mean membranes that are impervious to liquid water but that allow the passage of water vapor, i.e. by pervaporation. Hydrophilic membranes or coatings, hereinafter collectively referred to as membranes in this disclosure, feature sufficiently high water vapor transmission rates, as defined below, so that water that has passed through the membranes can be used directly in applications including irrigating plants. Such membranes can comprise one or more layers made from materials including but not limited to the same or different hydrophilic polymers. As long as the water vapor permeation rate of the membrane in total is sufficiently high, this water can be provided at a rate consistent with its use in a given practical application as described. The non-porous nature of the membranes disclosed here serves to exclude any particulate impurities from passing through such a membrane, including microbes such as bacteria and viruses. In addition, it has been discovered that membranes made from the hydrophilic polymers described in the present invention significantly reduce or prevent the passage of dissolved salts. Therefore, the ability to use not only fresh water, but also water that may contain suspended or dissolved impurities, to produce desired amounts of purified water by ervaporation allows saline water, including but not limited to sea water or brackish water, after processing through the devices of the present invention, to be used to irrigate land and sustain plant growth.

The rate at which water pervaporates through the hydrophilic membrane depends to a large extent upon the nature of the material from which it is made, and upon the thickness of the one or more separate or combined layers of polymer from which the hydrophilic membrane is constructed. With the appropriate choice of material, thickness and membrane construction, the rate at which water pervaporates through the said hydrophilic membrane may be adjusted to suit the particular water requirements of the plants to be irrigated.

The rate at which water pervaporates through the membrane made from the hydrophilic polymer also depends, among other factors, upon the moisture content on the non-water side. Therefore, irrigation systems based on the membranes of the present invention are self-regulating and may be "passive" in nature, providing more water to plants under dry conditions and less under humid conditions.

The standard test for measuring the rate at which a given membrane transmits water is ASTM E-96-95—Procedure BW, previously known and named as ASTM E-96-66—Procedure BW, which is used to determine the Waver Vapor Transmission Rate (WVTR) of a membrane.

The hydrophilic membrane for use with devices of the present invention are made from hydrophilic polymers. "Hydrophilic polymers" means polymers which absorb water when in contact with liquid water at room temperature according to the International Standards Organization ISO 62 (Equivalent to the American Society for Testing and Materials specification ASTM D 570).

The hydrophilic polymer can be one or a blend of several polymers, for example, the hydrophilic polymer can be a copolyetherester elastomer or a mixture of two or more copolyetherester elastomers as described below, such as polymers available from E.I. du Pont de Nemours and Company under the trade name Hytrel®; or a polyether-block-polyamide or a mixture of two or more polyether-block polyamides, such as polymers available from the Elf-Atochem Company of Paris, France, under the trade name of PEBAX; or a polyether urethane or a mixture of polyether urethanes; or homopolymers or copolymers of polyvinyl alcohol or a mixture of homopolymers or copolymers of polyvinyl alcohol.

A particularly preferred polymer for preparing membranes for use in the devices of the present invention is a copolyetherester elastomer or mixture of two or more copolyetherester elastomers having a multiplicity of recurring long-chain ester units and short-chain ester units joined head-to-tail through ester linkages, where the long-chain ester units are represented by the formula:

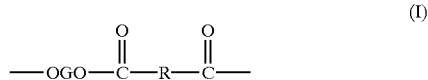

(I)

and said short-chain ester units are represented by the formula:

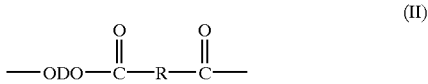

(II)

wherein:
  a) G is a divalent radical remaining after the removal of terminal hydroxyl groups from a poly(alkylene oxide) glycol having a number average molecular weight of about 400–4000;
  b) R is a divalent radical remaining after the removal of carboxyl groups from a dicarboxylic acid having a molecular weight less than 300;
  c) D is a divalent radical remaining after the removal of hydroxyl groups from a diol having a molecular weight less than about 250; optionally
  d) the copolyetherester contains 0–68 weight percent, based on the total weight of the copolyetherester, ethylene oxide groups incorporated in the long-chain ester units of the copolyetherester; and
  e) the copolyetherester contains about 25–80 weight percent short-chain ester units.

This preferred polymer is suitable for fabricating into thin but strong membranes, films and coatings. The preferred polymer, copolyetherester elastomer and methods of making it are known in the art, such as are disclosed in U.S. Pat. No. 4,725,481 for a copolyetherester elastomer with a WVTR of 3500 g/m²/24 hr, or U.S. Pat. No. 4,769,273 for a copolyetherester elastomer with a WVTR of 400–2500 g/m²/24 hr. Both are hereby incorporated by reference.

The polymer can be compounded with antioxidant stabilizers, ultraviolet stabilizers, hydrolysis stabilizers, dyes or pigments, fillers, anti-microbial reagents and the like.

The use of commercially available hydrophilic polymers as membranes is possible in the context of the present invention, although it is more preferable to use copolyetherester elastomers having a WVTR of more than 400 g/m²/24 hr measured on a film of thickness 25 microns using air at 23° C. and 50% relative humidity at a velocity of 3 m/s. Most preferred is the use of membranes made from commercially available copolyetherester elastomers having a WVTR of more than 3500 g/m²/24 hr, measured on a film of thickness 25 microns using air at 23° C. and 50% relative humidity at a velocity of 3 m/s.

The hydrophilic polymers can be manufactured into membranes of any desired thickness by a number of processes. A useful and well-established way to make membranes in the form of films is by melt extrusion of the polymer on a commercial extrusion line. Briefly, this entails heating the polymer to a temperature above the melting point, extruding it through a flat or annular die and then casting a film using a roller system or blowing a film from the melt.

Useful optional support materials include woven, non-woven or bonded papers, fabrics and screens permeable to water vapor, including those constructed from fibers of organic and inorganic polymers stable to moisture such as polyethylene, polypropylene, fiberglass and the like. The support material both increases strength and protects the membrane. The support material may be disposed on one side of the hydrophilic polymer membrane or both sides. When disposed on only one side, the support materials can be in contact with the source of water or away from it. Typically the support material is disposed on the outside of containers formed by the hydrophilic polymer membrane to best protect the membrane from physical damage and/or degradation by light.

In the devices of the present invention, the one or more surfaces comprising a hydrophilic membrane may each optionally be provided with a support material to protect it from physical damage; however it is also preferred that this surface retains a sufficient degree of flexibility such that good contact with the growing medium surface will be maintained once the device is placed upon it.

Preferably in the devices of the present invention the material that is impervious to water in all forms is polyvinyl chloride; polyethylene that has been protected from UV radiation; polyamide that has been protected from UV radiation or a metal like steel, aluminum or the like.

Preferably in the devices of the present invention the only surfaces that are a hydrophilic membrane are ones that will be in contact with a growing medium in use. Preferably also, all of the surfaces that are in contact with growing medium when the devices of the present invention are in use will be hydrophilic membrane.

By including at least one surface that is impervious to water in all forms in the devices of the present invention, release of water other than into a growing medium may be reduced or even eliminated, thus avoiding wastage of water.

Preferably in the devices of the present invention the surfaces that are impervious to water in all forms provide a degree of structural support so that the container does not collapse entirely as water is removed.

Preferably in the devices of the present invention the surfaces that are impervious to water in all forms provide protection from mechanical, biological, biochemical or ultra-violet damage. This protection may be achieved by selecting the impervious materials appropriately or by the addition of exterior supporting or strengthening structures. The exterior supporting or strengthening structures may be made of any material having appropriate physical characteristics, for example wood, metal, porous pipe, terracotta, concrete or PVC foam.

Simple devices of the present invention may comprise a sheet of hydrophilic membrane and a sheet of impervious flexible material, joined together at their edges and filled with water before sealing to make a bag. Such a device will emit water from the surface that is a hydrophilic membrane and in contact with, for example, soil will maintain a consistent water content therein.

Other simple versions of the devices of the present invention include tubes or pipes having a first ground contacting surface comprising a hydrophilic membrane and an upper surface comprising a material that is impervious to the passage of water in any form. Such tubes or pipes may be produced in two or more parts, or may be produced as a single (e.g. extruded) pipe or tube of hydrophilic membrane which is then partially coated with a material that is impervious to water in all forms.

The devices of the present invention may also be in the form of large sheets to irrigate particularly dry areas of ground or for the growth of plants requiring large amounts of water. Such sheets will preferably consist of a lower surface that is a hydrophilic membrane and an upper surface that is impervious to water in all forms, the surfaces being sealed at their edges (and optionally at intervals throughout the structure) to form a container or series of containers for water. These structures will also preferably have gaps within the structure so that plants can grow upwards through them.

The rate of water transmission through the hydrophilic membrane of the devices of the present invention may be affected by the temperature of the water and this effect may be utilized, if required, by selecting the colors of the surfaces that are impervious to water in all forms appropriately so that they are heated by sunlight to increase the rate of water transfer. Alternatively, these surfaces may be made of reflecting materials if it is preferred that this effect is minimized.

Preferably, the devices of the present invention are refillable or permanently contain water. This may be achieved either by the provision of, for example, a simple valve so that water may be poured in, or by permanent connection to a water source that is either activated periodically or is of a low enough pressure that water is only drawn into the devices of the present invention as it is released therefrom, to maintain a constant water content therein.

In use, the devices of the present invention may simply be placed at intervals in an area requiring irrigation and monitored occasionally to maintain sufficient water levels. Alternatively, for at least semi-permanent use, a number of devices of the invention may be connected together to form a network that is connected to a single water supply. The connecting structures may be non-permeable or may themselves function as devices of the present invention.

Devices of the present invention are preferably placed on the surface of the growing medium in use, and they are therefore particularly easy to monitor and maintain/repair. They may also be easily avoided by agricultural machinery or may be removed before such machinery is used. However, devices of the present invention may also be partially or completely buried and, in this case, it is preferred that the at least one surface that is a hydrophilic membrane is directed towards the primary root growing region, i.e. downwards, if the devices of the present invention are buried shallowly or upwards if they are buried at a depth below normal root growth.

The water used in the devices of the present invention may be of any quality, as contaminants (both chemical, physical and microbiological) will not pass through the hydrophilic membrane; however, it is preferred that if the devices are to be regularly refilled (or are connected to a permanent water supply) the devices of the invention are occasionally purged, so that there will not be a build-up of contaminants which could be damaging to the growing medium if the devices are ever accidentally breached.

In a further aspect of the present invention, there is provided a rooting container comprising a lower layer comprising a biodegradable material and an upper layer comprising a hydrophilic membrane, the lower and upper layers being sealed together at their edges to form a hollow cavity, the cavity containing seeds or seedlings.

In use, the container of the further aspect of the present invention is placed upon an area of growing medium and exposed to rain or artificial watering. The water will penetrate the hydrophilic membrane and cause the seeds to germinate and the seedlings to grow. The roots of the germinating seeds and seedlings will penetrate the biodegradable layer and enter the growing medium.

Preferably in the containers of the further aspect of the present invention the hydrophilic membrane will be photo-degradable so that it degrades once the seeds have begun to germinate.

Preferably in the containers of the further aspect of the present invention the cavity also contains growing medium which may be selected from any of the materials discussed above, and within which the seeds and/or seedlings are distributed.

Preferably the containers of the further aspect of the present invention may be of any size; however, it is preferred that they are either relatively small (for example 10 cm by 10 cm or less) or that they are divided up into separate cells so that a sheet of such cells may be used or individual cells may be cut off and placed separately.

Preferably in the containers of the further aspect of the present invention the upper surface will include water collection and retention features such as dimples.

The upper hydrophilic membrane surface of the containers of the further aspect of the present invention may be manufactured from any of the hydrophilic polymers discussed above, optionally selected to be photo-degradable or comprising an additional component to impart photo-degradability. The lower bio-degradable surface may comprise any bio-degradable material having a necessary degree of strength but which is penetrable by plant roots, for example paper, cotton or other woven or non-woven fabric made from plant fibers.

The containers of the further aspect of the present invention allow the planting of seeds or seedlings to be simplified and will prevent seeds from being blown away, washed away in heavy rain or from rolling away on sloping ground.

Exemplary embodiments of the present invention will now be further described with reference to the accompanying drawings; in which.

Figure 1:
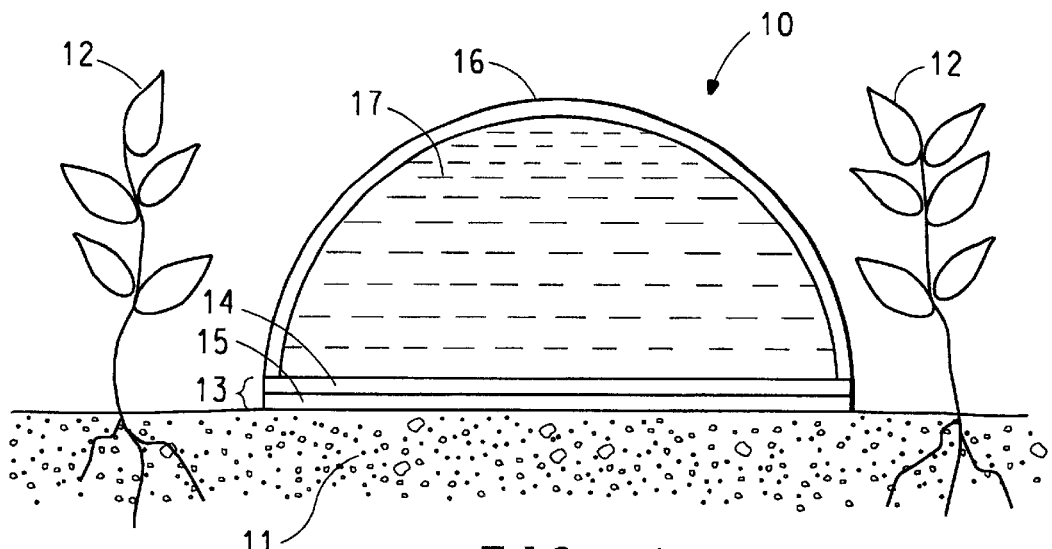
FIG. 1 is a diagrammatic representation of a first embodiment of an irrigation device of the present invention.

Referring to the figures, FIG. 1 shows a first embodiment of an irrigation device 10 placed upon an area of natural soil 11 in which plants 12 are growing. The device 10 comprises a first surface 13 which is a layer of hydrophilic membrane 14 made from an extruded film of copolyetherester elastomer of thickness around 75 microns bonded to a water permeable support layer 15 (paper). The device 10 has a second surface 16 which is composed of polyvinyl chloride of about 1 mm thickness. In use, the device 10 is filled with water 17 via a valve (not shown) and is placed on the ground 11 with the first surface 13 in contact therewith. Water vapor passes through the hydrophilic membrane 14 and the support surface 15 and is absorbed into the ground 11. As the water 17 diffuses outwards from the point of contact, further water 17 is released by the device 10 at a rate controlled by the relative moisture of the ground 11. The device 10 may be refilled via the valve as required.

Figure 2:
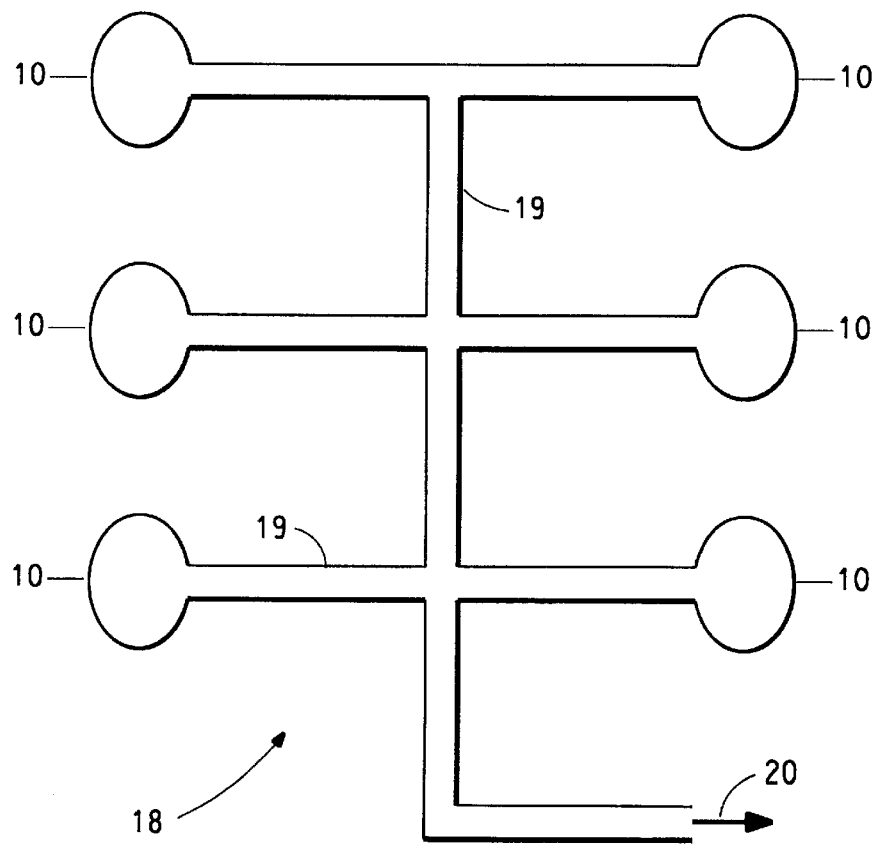
FIG. 2 is a diagrammatic representation of an alternative embodiment of an irrigation device of the present invention viewed from above.

FIG. 2 is a representation of an alternative embodiment of an irrigation device 18 seen from above. The device comprises a series of devices 10 as shown in FIG. 1, connected together by a network of hoses 19 composed of polyvinyl chloride. The network is connected to a water source 20 (not shown) which allows the system of devices 10 to be refilled with water as required. This device 18 may be used to irrigate a large area such as an entire field or a commercial greenhouse.

Figure 3:
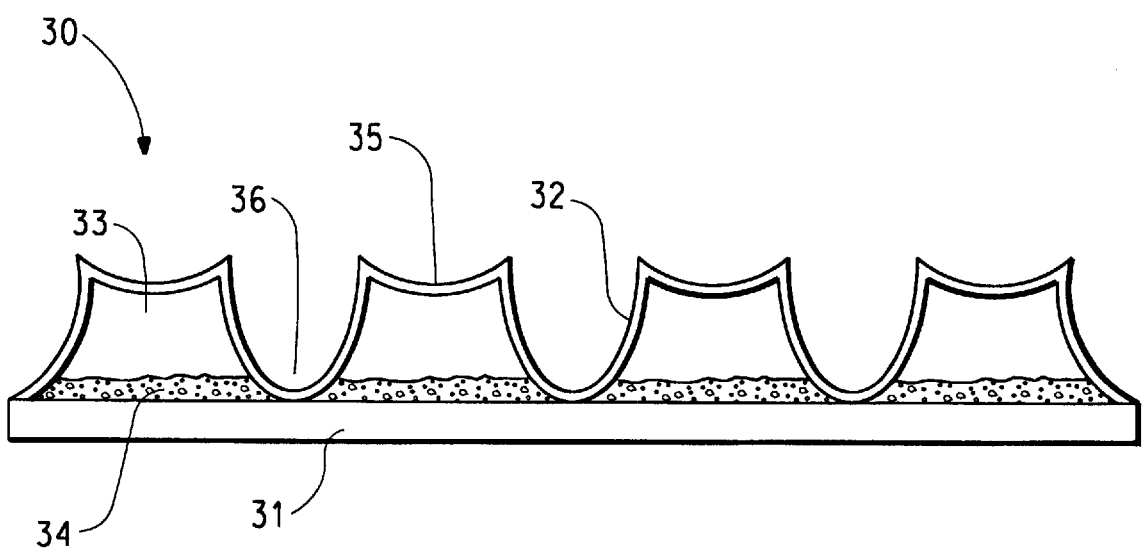
FIG. 3 is a diagrammatic representation of an embodiment of a further aspect of the present invention.

FIG. 3 is a representation of an embodiment of a rooting container 30. The container comprises a lower biodegradable layer 31 which is paper and an upper layer 32 which is a hydrophilic membrane made from a film of copolyetherester of a thickness of around 75 microns enclosing a series of chambers 33. The upper layer 32 and lower layer 31 are sealed at their edges and between each chamber 33. Each chamber 33 encloses a growing medium 34 (natural soil) and grass seeds. The upper layer 32 is shaped to provide dimples 35 and channels 36 to retain and distribute water falling upon the container 30.

What is claimed is:

1. A rooting container comprising a lower layer comprising a biodegradable material and an upper layer comprising a hydrophilic membrane, said lower layer and said upper layer being sealed together at their edges to form a hollow cavity, said hollow cavity containing seeds or seedlings.

2. The method of rooting seeds or seedlings into an area of growing medium comprising the steps of:
    placing a rooting container onto the area of growing medium, the rooting container comprising a lower layer comprising a biodegradable material and an upper layer comprising a hydrophilic membrane, the lower layer and the upper layer being sealed together at their edges to form a hollow cavity, the hollow cavity containing seeds or seedlings; and
    exposing the rooting container to rain or artificial watering.

3. An irrigation device comprising:
    at least one surface comprising a hydrophilic membrane; and
    at least one surface comprising material impervious to water in all forms,
    wherein said surfaces comprise a container for water.

4. The irrigation device of claim 3, wherein said at least one surface comprising a hydrophilic membrane is provided with at least one support surface.

5. The irrigation device of claim 3, wherein said at least one surface comprising material impervious to water in all forms provides protection from mechanical, biological, biochemical or ultra-violet damage.

6. The irrigation device of claim 3, further comprising means for refilling the device with water.

7. The irrigation device of claim 3, wherein said hydrophilic membrane comprises a polymer selected from copolyetherester elastomers, polyether-block-polyamides, polyether urethanes, homopolymers or copolymers of polyvinyl alcohol, or mixtures thereof.

8. The irrigation device of claim 7, wherein said hydrophilic membrane comprises one or more copolyetherester elastomers having a multiplicity of recurring long-chain ester units and short-chain ester units joined head-to-tail through ester linkages said long-chain ester units being represented by the formula:

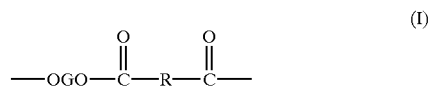

and said short-chain ester units are represented by the formula:

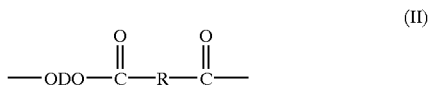

wherein:
    G is a divalent radical remaining after the removal of terminal hydroxyl groups from a poly(alkylene oxide) glycol having a number average molecular weight of about 400–4000;
    R is a divalent radical remaining after removal of carboxyl groups from a dicarboxylic acid having a molecular weight less than 300;
    D is a divalent radical remaining after removal of hydroxyl groups from a diol having a molecular weight less than about 250;
    the copolyetherester contains 0–68 weight percent, based on the total weight of the copolyetherester, ethylene oxide groups incorporated in the long-chain ester units of the copolyetherester; and
    the copolyetherester contains about 25–80 weight percent short-chain ester units.

9. A method for providing water to a growth medium, comprising the steps of:
    providing a device comprising at least one surface comprising a hydrophilic membrane and at least one surface comprising material impervious to water in all forms, said surfaces defining a container for water;
    providing water to the container of the device;
    placing the device in proximity to a growth medium, the at least one surface comprising the hydrophilic membrane being in contact with the growth medium; and
    transmitting the water from the device through the at least one surface comprising the hydrophilic membrane and into the growth medium.

10. The method of claim 9, wherein the at least one surface comprising a hydrophilic membrane further comprises at least one support surface.

11. The method of claim 9, wherein said placing step comprises placing the device on a surface of the growth medium, the at least one surface comprising the hydrophilic membrane being in contact with the growth medium, whereby the water is transferred from the device through the at least one surface comprising the hydrophilic membrane and into the growth medium.

12. The method of claim 9, wherein said placing step comprises partially burying the device within the growth medium, the at least one surface comprising the hydrophilic membrane being in contact with the growth medium, whereby the water is transferred from the device through the at least one surface comprising the hydrophilic membrane and into the growth medium.

13. The method of claim 9, wherein said placing step comprises completely burying the device within the growth medium, the at least one surface comprising the hydrophilic membrane being in contact with the growth medium, whereby the water is transferred from the device through the at least one surface comprising the hydrophilic membrane and into the growth medium.

14. A method for providing water to a growth medium, comprising the steps of:

provided a device comprising at least one surface comprising a nonporous hydrophilic membrane and at least one surface comprising material impervious to water in all forms, said surfaces defining a container for water;

providing water to the container of the device;

placing the device in proximity to a growth medium, the at least one surface comprising the hydrophilic membrane being in contact with the growth medium; and transmitting the water from the device through the at least one surface comprising the hydrophilic membrane and into the growth medium.

15. A method for providing water to a growth medium, comprising the steps of:

providing a device comprising at least one surface comprising a nonporous hydrophilic membrane comprising copolyetherester elastomer and at least one surface comprising material impervious to water in all forms, said surfaces defining a container for water;

providing water to the container of the device;

placing the device in proximity to a growth medium, the at least one surface comprising the hydrophilic membrane being in contact with the growth medium; and transmitting the water from the device through the at least one surface comprising the hydrophilic membrane and into the growth medium.

\* \* \* \* \*